United States Patent [19]

Mandish

[11] 4,355,484
[45] Oct. 26, 1982

[54] HYDROPONIC TRAY AND METHOD OF MANUFACTURE

[76] Inventor: Theodore O. Mandish, Rte. 2, Box 184, Titusville, Fla. 32780

[21] Appl. No.: 299,806

[22] Filed: Sep. 8, 1981

[51] Int. Cl.³ ............................................. A01G 31/02
[52] U.S. Cl. ............................................. 47/58; 47/63
[58] Field of Search ..................................... 47/58–65, 47/80, 86

[56] References Cited

U.S. PATENT DOCUMENTS

| | | | |
|---|---|---|---|
| 2,531,562 | 11/1950 | Eve | 47/80 |
| 3,911,514 | 10/1975 | Ito | 47/59 |
| 4,034,506 | 7/1977 | Kasahara et al. | 47/64 |
| 4,037,360 | 7/1977 | Farnsworth | 47/63 |
| 4,074,997 | 2/1978 | Cohen | 47/58 |
| 4,257,191 | 3/1981 | Holter et al. | 47/80 |
| 4,312,152 | 1/1982 | Drury et al. | 47/63 |

FOREIGN PATENT DOCUMENTS

| | | | |
|---|---|---|---|
| 922106 | 3/1973 | Canada | 47/80 |
| 2037013 | 2/1972 | Fed. Rep. of Germany | 47/63 |
| 2239120 | 3/1975 | France | 47/59 |
| 2292419 | 7/1976 | France | 47/63 |
| 2014836 | 9/1979 | United Kingdom | 47/59 |
| 2042491 | 9/1980 | United Kingdom | 47/62 |

Primary Examiner—E. H. Eickholt
Attorney, Agent, or Firm—William M. Hobby, III

[57] ABSTRACT

A floating hydroponic apparatus is provided along with a hydroponic system using the hydroponic apparatus. The floating hydroponic apparatus has a floating hydroponic tray having a floating base portion and a tray portion. The floating base portion is made of a lightweight cement and has floating perimeter walls along with a polymer screen attached between the floating base portion and the tray portion. The floating base portion and tray portion form a plurality of openings therethrough for the passage of liquid. An alkaline resistant coating is applied to at least a portion of the tray. The tray portion is filled with a soil mixture supported by the polymer screen so that plants can be grown in the soil in the trays while the trays are floating upon a liquid reservoir. The trays can be used in conjunction with a hydroponic system having pools with specially designed lightweight concrete walls forming a habitat for marine life.

14 Claims, 9 Drawing Figures

U.S. Patent   Oct. 26, 1982   Sheet 1 of 3   4,355,484
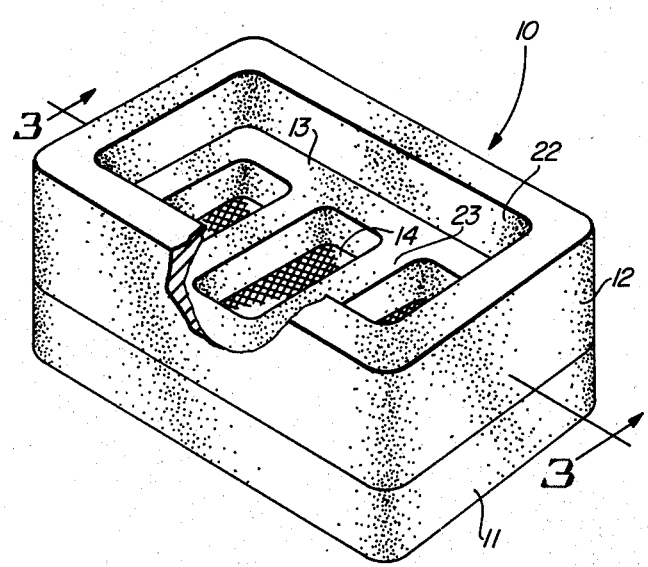
Fig-1
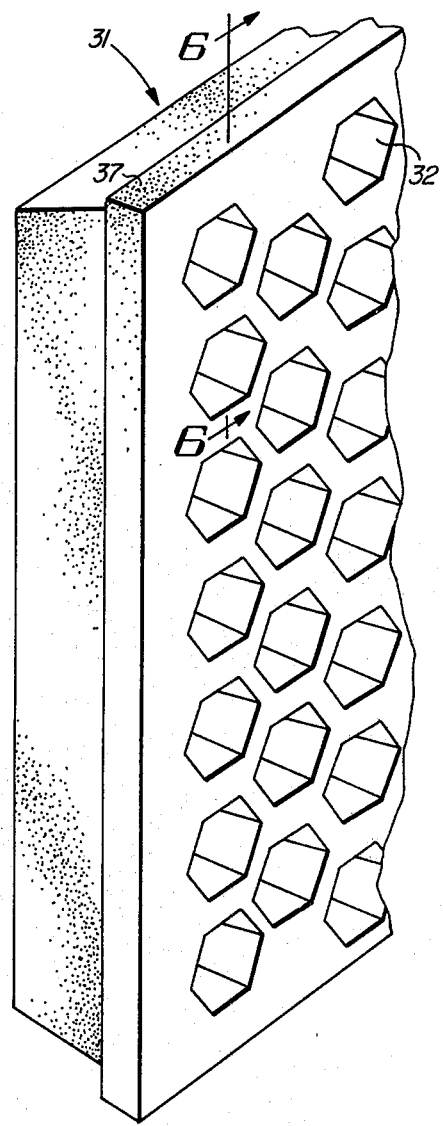
Fig-5
Fig-2
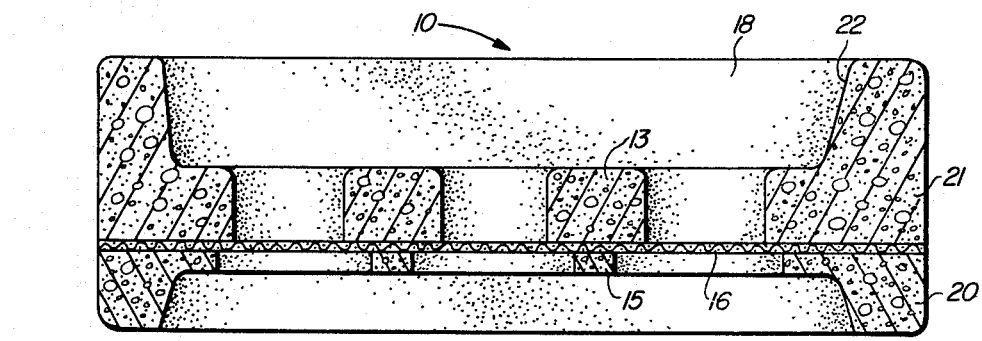
Fig-3

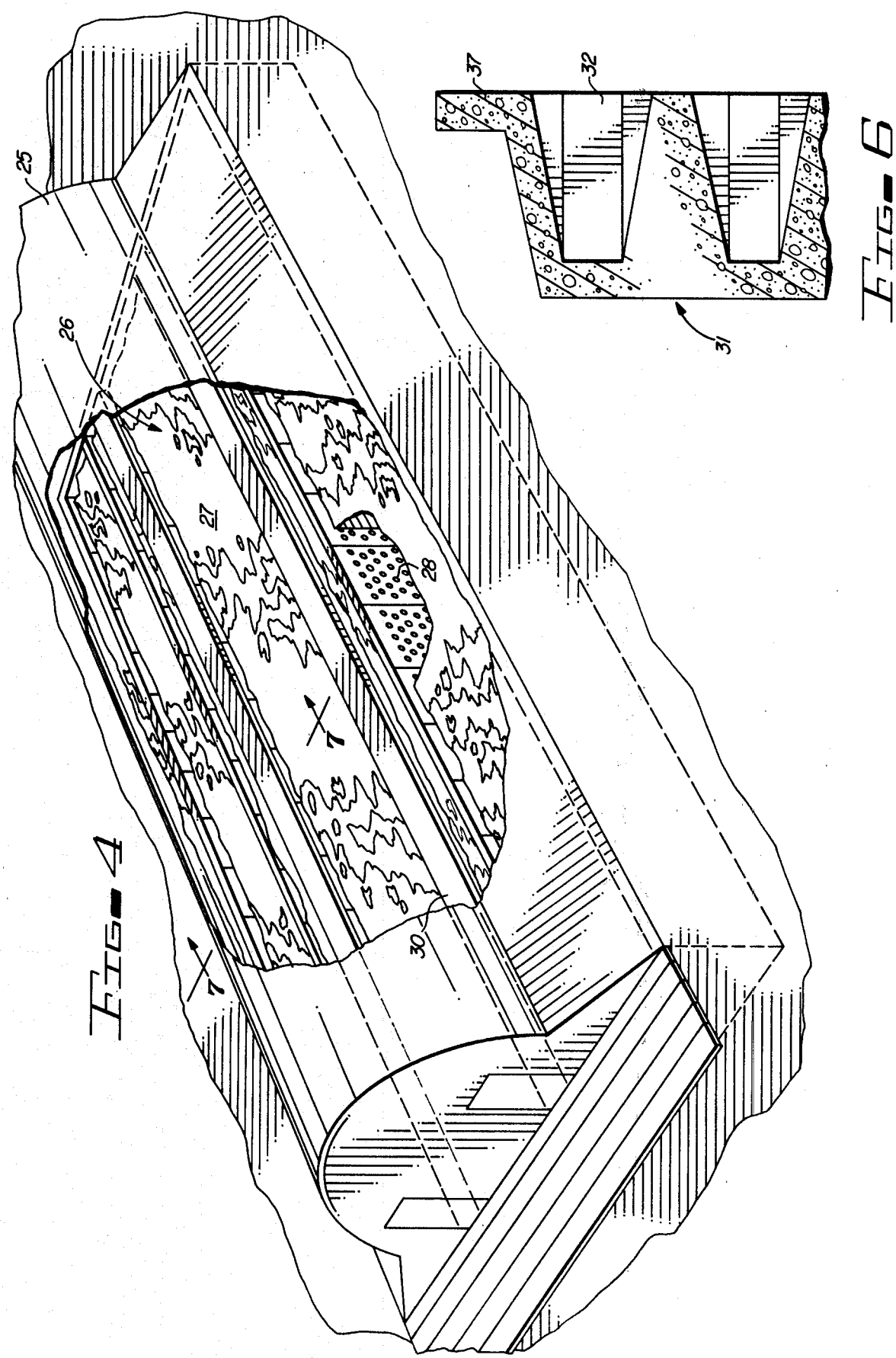

HYDROPONIC TRAY AND METHOD OF MANUFACTURE

BACKGROUND OF THE INVENTION

The present invention relates to hydroponic systems and especially to a hydroponic system having a floating hydroponic tray for the growth of hydroponic plants and to a specially designed pool for the floating trays.

In the past, a wide variety of hydroponic devices have been provided for growing plants in a liquid nutrient. Typical hydroponic devices have supporting materials, such as rocks, to support the plant roots. Most prior art devices, however, are directed towards small containers for use in the home by individuals for growing their own plants. The present invention, on the other hand, is for commercial hydroponic farming which can be done on otherwise wasted swamp lamd or in specially constructed pools, in accordance with the present invention, and which pools can be utilized for harvesting shrimp or fish or other marine organisms in the pools below the floating hydroponic trays. Another advantage of the present invention is that floating trays are made of a lightweight concrete, which is fairly permanent and inexpensive to manufacture. However, since concrete is made with lime, the concrete will not totally prevent the seepage of water therethrough. A special treatment and coating is used on the concrete trays to prevent a shift in the pH in the hydroponic tray, which could damage plants which are frequently very sensitive to soil pH.

SUMMARY OF THE INVENTION

The present invention relates to a floating hydroponic tray apparatus and to a specially designed pool for floating the floating trays upon. The pool may be designed to provide a habitat for various types of marine life, such as shrimp or certain types of fish. The floating tray has a floating base portion and a tray portion. The base portion is made of a lightweight cement and has a floating perimeter wall and hollow center portion. The upper tray portion also has coacting openings in the hollow portion of the floating tray and a polymer screen is mounted between the base portion and the tray portion. The concrete trays may be dipped in an acidic solution and leeched to neutralize the alkalinity. An alkaline resistant coating is applied to at least a portion of the tray and the tray is filled with a soil mixture for supporting the growth of plants. Thus, floating the base portion with the tray attached thereto will maintain the soil mixture moist from the water the tray is floating on. The lightweight concrete may be made from a mixture of cement, water, polystyrene beads, which beads are specially coated prior to the forming of the concrete trays. The soil moisture may include fifty percent (50%) or more of polystyrene beads, along with organic matter and an organic fertilizer and may have been pre-treated with a fungicide and germicide. The alkaline resistant coating may be a polymer coating applied to the inner surface of the floating tray. The floating tray may be used in a specially designed pool and may have additional flotation added to the underside where heavier plants are to be grown.

The hydroponic system has a pool formed with walls, light-weight concrete and having a plurality of cavities formed in the walls for breeding marine life in the pool. A floating hydroponic tray may be floated on the pools. Pools may be formed of walls which can be pre-cast and interconnected and may have inner dividing walls for spacing the hydroponic trays which may include catwalks for access to the floating trays.

A method is also provided for making a hydroponic tray including the steps of mixing foam polymer beads, such as polystyrene beads, with a mixture including dehydrated lime and hydrated alumina in approximately equal amounts, then mixing said coated beads with cement. The beads and cement are then mixed with water and molded to form a hydroponic tray in accordance with the present invention. The molded tray is dipped in a weak acid solution, such as muratic acid, diluted with water (10%–15% muratic acid in water), the tray is then leeched with water to remove excess acid and at least the inside portion of the tray is coated with a polymeric coating, which is alkaline resistant. The process may also include the filling of the trays with a mixture of polymer beads and an organic material, such as sawdust, and may also include a fertilizer in the mixture as well as a germicide and fungicide, as desired.

BRIEF DESCRIPTION OF THE DRAWINGS

Other objects, features and advantages of the present invention will be apparent from the written description and the drawings, in which:

FIG. 1 is a top perspective view with a removed portion of a floating hydroponic tray in accordance with the present invention;

FIG. 2 is a bottom perspective view of the floating tray in accordance with FIG. 1;

FIG. 3 is a sectional view taken on the line 3—3 of FIG. 1;

FIG. 4 is a cutaway perspective view of a covered hydroponic greenhouse in accordance with the present invention;

FIG. 5 is a cutaway perspective view of a portion of a wall of the hydroponic pool in accordance with the present invention;

FIG. 6 is a sectional view taken on the line 6—6 of FIG. 5;

DESCRIPTION OF THE PREFERRED EMBODIMENTS

Figure 7:
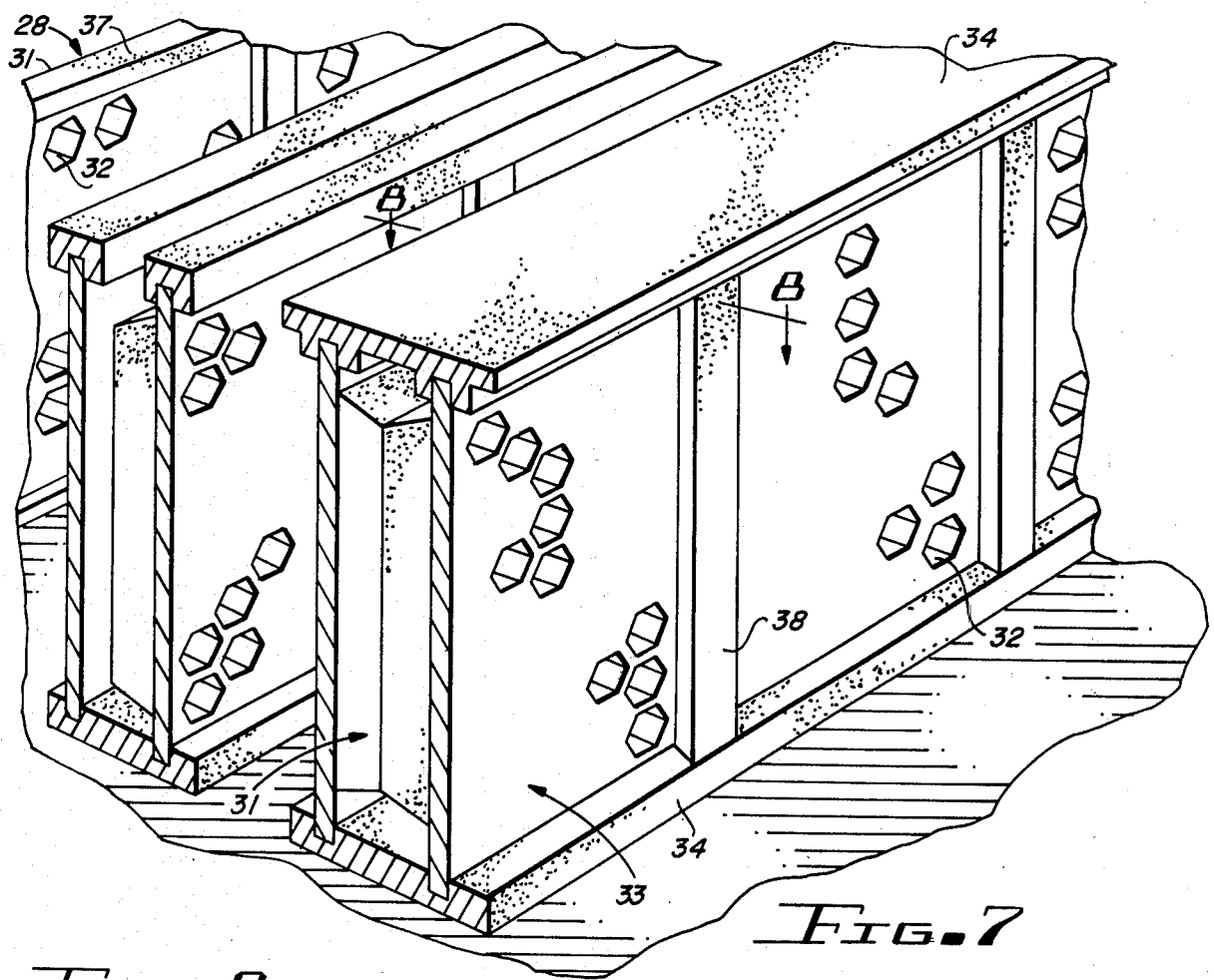
FIG. 7 is a partial perspective view taken on the line 7—7 of FIG. 4.
Figure 8:
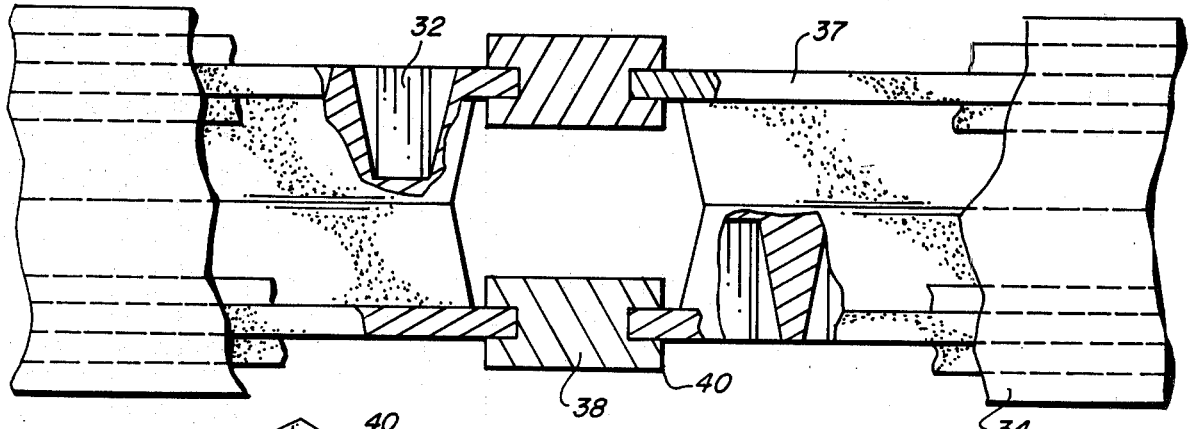
FIG. 8 is a cutaway sectional view taken on the line 8—8 of FIG. 7.
Figure 9:
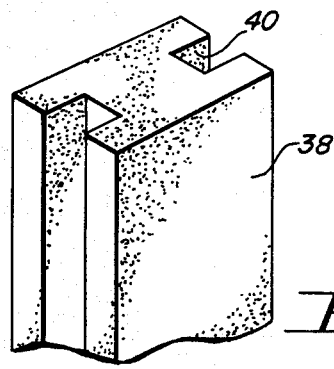
FIG. 9 is a partial perspective view of the connecting members for the walls.

Referring to FIGS. 1 through 3, a floating hydroponic tray 10 has a floating base portion 11 formed of lightweight concrete made using cement and polystyrene beads. The ratio of the beads is such that the lightweight concrete will float in water and will support a lightweight cement tray portion 12. The tray portion is hollow with support members 13 having open spaces 14 therebetween. The floating base portion is also hollow with support members 15 therein and has a polymer screen 16 molded therein to fill the open spaces 17 in the base portion 11 and the open spaces 14 in the tray portion. The tray portion 12 is formed of a lightweight concrete made from a mixture of cement and polystyrene beads, which beads may be coated to prevent the beads from floating during the curing of the concrete, so that the beads remain more uniformly distributed throughout the concrete. The trays may also be reinforced with small fiberglass, stainless steel, or other fibers if desired. The floating tray 10 and tray portion 12 is filled with soil 18, as shown in FIG. 3, which is supported on the screen 16 which is maintained between the brace members 15 and the tray portions 13 and is formed into the perimeter walls 20 and 21 of the floating base portion 11 and of tray portion 12. It should be clear at this point that the floating hydroponic unit 10 can be formed in one piece or in two pieces in which the tray portion 12 is removable from the lower base portion.

In the embodiment shown, the floating tray is formed in one piece with the screen extending all the way to the edge of the walls. The soil 18 is specially formulated of fifty percent (50%) or more of polystyrene beads mixed with organic material, such as sawdust, or the like, and with an organic fertilizer having a slow release of the nutrients. The floating hydroponic apparatus 10, once charged, does not have to be fertilized or cared for until after harvesting, at which time the soil can be replaced. The soil can also be treated with a fungicide and germicide prior to charging the floating tray. The tray is dipped in an acid solution and leeched to neutralize the alkalinity. The tray interior walls 22 and the bottom surface 23 are then coated with an alkaline resistant coating such as a polymeric coating, to prevent the seepage of the alkaline from the cement into the soil and damaging the plants. The interior of the floating base can also be treated as desired, but it is not necessary to treat the exterior walls of the floating tray.

It should be clear at this point that a floating hydroponic tray has been provided which will continuously provide water from the pool that the tray is floating on. The tray can float in pools, ponds, or shallow swamps as desired, while providing the necessary liquid for the hydroponic growth of plants, which will require a little care once the trays are charged with the soil composition.

The use of concrete allows for a relatively permanent, long lasting tray that can be used for many growing seasons without replacement. Cement, when formed with the lightweight polystyrene beads, float in water to provide ample water to the roots of the plants. The acid treatment and coating prevent the soil from becoming alkaline and stunning the growth entire wall section cavities can be coated with a polymer coating if desired.

It should be clear that a hydroponic system has been provided for growing hydroponic plants, while at the same time harvesting certain marine products. However, the invention is not to be construed as limited to the particular forms disclosed herein, which are to be regarded as illustrative rather than restrictive.

I claim:

1. A method of making a floating hydroponic apparatus having a tray with a floating base portion and a tray portion comprising the steps of:
   mixing foamed polymer beads and cement;
   mixing the foamed polymer beads and cement with water;
   molding a hydroponic tray having a floating base portion and a tray portion and a screen attached between the base portion and tray portion and having the tray portion open through to the base portion;
   dipping said tray portion in an acidic solution; and
   coating at least a portion of said tray with an alkaline resistant coating.

2. A method in accordance with claim 1, which the step of mixing foam polymer beads, cement and water includes premixing foam polymer beads coated with dehydrated lime and hydrated alumina, mixing said coated polymer beads with said cement and adding water to said mixture prior to molding said hydroponic trays.

3. A method in accordance with claim 2, including the step of filling each tray with a soil mixture having foamed polymer beads and organic material mixed together.

4. A method in accordance with claim 3, in which the step of dipping said tray in an acid solution includes dipping said tray in a weak solution of muratic acid diluted with water and thereafter leeching said tray with water.

5. A floating hydroponic apparatus comprising in combination:
   a tray having a floating base portion and a tray portion, said base portion being made of lightweight concrete and having a floating perimeter wall, such tray having a polymer screen attachment to the perimeter wall between said base portion and said tray portion, said polymer screen being adapted to support soil thereon;
   an alkaline resistant coating covering at least a portion of said tray; and
   a soil mixture filling a portion of said tray within said perimeter walls and supported by said polymer screen, whereby plants can be grown in said soil mixture in said tray while said tray float upon a liquid reservoir.

6. A floating hydroponic apparatus in accordance with claim 5, in which said tray is formed of one molded piece having said polymer screen formed therein.

7. A floating hydroponic apparatus in accordance with claim 5, in which said tray portion is removable from said base portion.

8. A floating hydroponic apparatus in accordance with claim 5, in which said tray is formed of lightweight concrete including at least fifty percent (50%) polystyrene beads by volume formed in a cement mixture.

9. A floating hydroponic apparatus in accordance with claim 8, in which said polystyrene beads are coated with a mixture of dehydrated lime and dehydrated alumina.

10. A floating hydroponic apparatus in accordance with claim 9, in which said alkaline resistant coating is a polymeric coating.

11. A floating hydroponic apparatus in accordance with claim 5, in which said tray portion has lightweight concrete bars formed across the bottom leaving open space therebetween.

12. A floating hydroponic apparatus in accordance with claim 11, in which said tray base portion has lightweight concrete bars formed therein leaving space therebetween and said polymer screen is positioned between the concrete bars of said base portion and said tray portion.

13. A floating hydroponic apparatus in accordance with claim 12, in which said soil mixture includes a mixture of polystyrene beads, organic matter and organic fertilizer.

14. A floating hydroponic apparatus in accordance with claim 13, in which said soil mixture includes a fungicide and germicide in said soil mixture.

* * * * *